6350X
J. Merrhall,
Wood Planing Machine.
Patented Jan. 25, 1831.
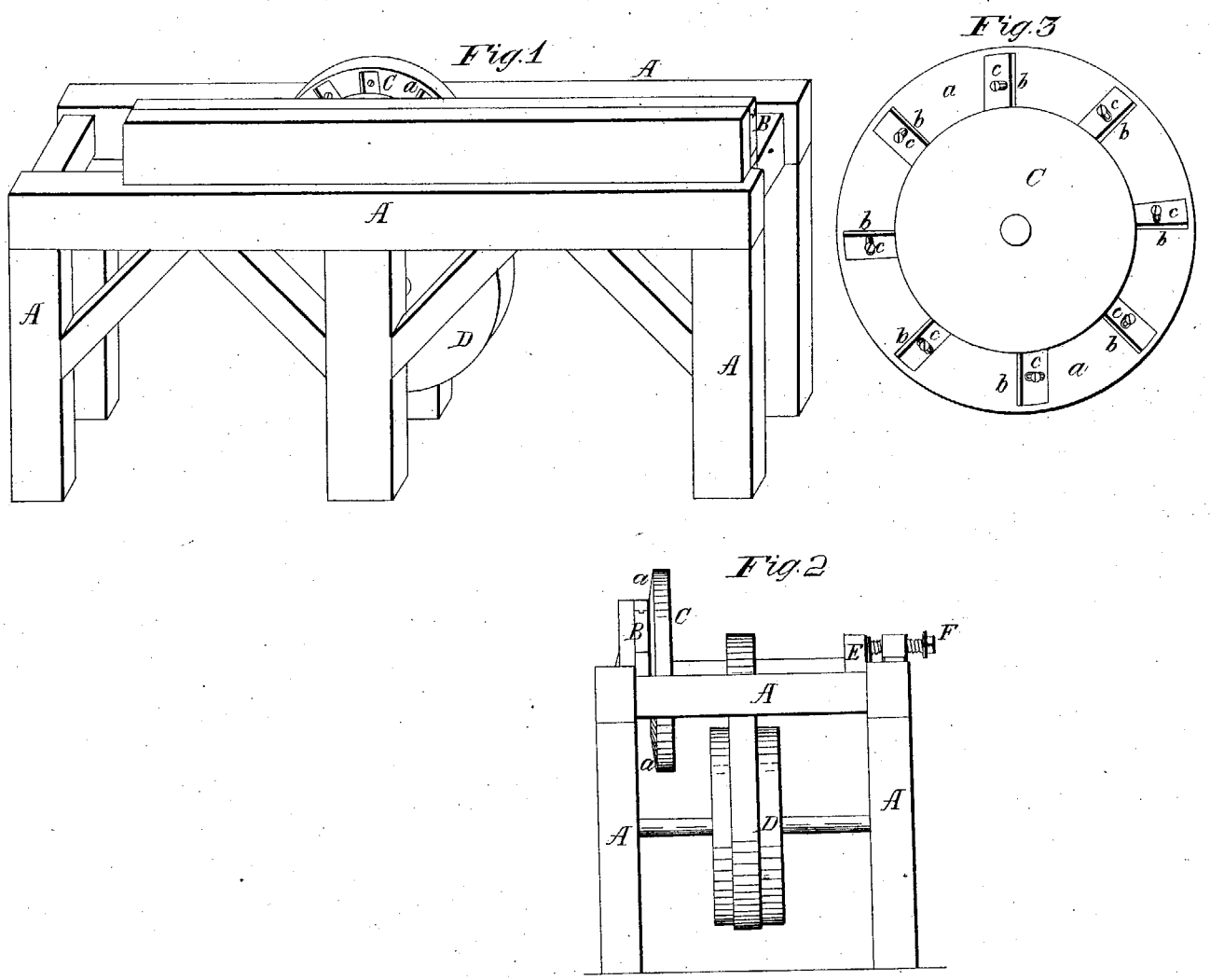
AM. PHOTO-LITHO. CO. N.Y. (OSBORNE'S PROCESS)

6350X

Jonathan Newhall

Letters Patent.

The Schedule referred to in these Letters Patent and making part of the same containing a description in the words of the said Jonathan Newhall him-self of his improvement in the Bevel wheel Plane for Planing Boards, timber &c.

This Machine consists of a Wheel three feet in diameter more or less. made of Wood or any other suitable material. confined upon the end of a metallic shaft of inflexible substance and sufficient length to form bearings for the revolution of the wheel and the application of appendages necessary to give it motion. The wheel is faced upon the side opposite to the shaft. with a bevel extending from the verge. some two inches more or less. towards the centre of the wheel. and about a half inch in depth at the periphery. Plane irons are imbedded in the rim of the wheel near the periphery. Their edges should correspond with the radius of the wheel. & the shape of the face as bevelled. Double Irons, may be used to prevent injury to cross grained wood. or single irons with good effect by means of metallic plates made as wide as the irons and about three inches in length. They should be imbedded before the edge of the plane iron. so as to agree with the face and form the mouth of the iron, being confined upon the rim of the wheel by a screw so constructed that the plate may slide in its bed to open or shut the mouth more or less at pleasure. ( a close mouth answering the purpose of a double iron )

To plane timber and boards. the wheel is placed in a vertical position; and for planing boards, a carriage is made of sufficient width and length to receive the board and made to traverse upon a rail parallel with the face of the wheel; being held by a tongue and groove at the upper edge to sustain its position. and worked by a rack and pinion at the lower edge by hand or otherwise at pleasure. The board is laid upon the carriage and held in place by a spring roller and suitable dogs. The wheel resting on suitable gudgeon blocks is made to slide in a horizontal direction towards the carriage, or from it agreeable to any thickness to be planed. By means of a sliding Bar Drawing fitted to the shaft so as to carry the wheel along with it. A lever or screw
is attached to the Box. and thereby brought to bear on the wheel. to give
it the position required. To plane joist a carriage is made of timber
of suitable length thickness and width to receive the joist which is
laid upon it with the side to be planed projecting towards the wheel
over the edge of the carriage as much as is to be planed off. and held
down by dogs at each end of the same formed for the purpose. The
carriage for joist and timber should run on two rails near its under
edges. and may be worked by a rack and pinion or otherwise at pleas-
ure. A horizontal position of the wheel is recommended when boards
or plank only are to be planed. The frame may be made according
to circumstances. and any convenient power may be applied. The
principles which I claim as new and being my invention are
1st The Bevel on the face of the wheel, the use of which is to admit
the lumber to enter between the carriage and the verge of the wheel
and thereby presenting the part to be planed off to the action of the
planes. — 2nd The sliding motion of the wheel. by which various
thicknesses may be planed. 3d The running the lumber by the cen-
tre as in the above description of planing boards.
4th The metallic plates. the use of which is to answer the purpose
of double irons. which principle is contemplated to be applied to hand
planes.. In testimony that the foregoing is a true specification
of the invention therein described and of the mode of using the same
I have hereunto set my hand and seal at Washington in the Coun-
ty of Lincoln and State of Maine this fourth day of January in the
year of our Lord one thousand Eight hundred and thirty one.

Exd.
W.J.C.
Witnesses
Samuel Doe
Thomas Doe.

Jonathan Newhall

[illegible]